United States Patent Office 3,798,317
Patented Mar. 19, 1974

3,798,317
NON-CAKING AEROSOL ANTI-PERSPIRANT COMPOSITION
Larry Austin Gorum, Winter Park, Fla., assignor to E. I. du Pont de Nemours and Company, Wilmington, Del.
No Drawing. Filed Nov. 24, 1971, Ser. No. 201,989
Int. Cl. A61k 7/00
U.S. Cl. 424—47                                    4 Claims

ABSTRACT OF THE DISCLOSURE

An aerosol anti-perspirant formulation comprising a fluorocarbon propellant, a dispersion of aluminum chlorohydroxide and fumed silica in an ethanol and 1,2-propylene glycol solution of aluminum chlorohydroxide-propylene glycol complex wherein the concentration of fumed silica is from about 1.0 to about 1.7 weight percent.

BACKGROUND OF THE INVENTION

(1) Field of the invention

A novel aerosol anti-perspirant formulation which will not cake in the aerosol package and which provides immediate and sustained anti-perspirant protection.

(2) Description of the prior art

Basic aluminum halides, especially aluminum chlorohydroxide complex, called Chlorhydrol, have been used in anti-perspirant compositions. Chlorhydrol, to which the structure $[Al_2(OH)_5Cl \cdot 2H_2O]_n$ has been assigned, is normally insoluble in ethanol solution, but aqueous solutions of Chlorhydrol are miscible with ethanol. It has been found, however, that these aqueous solutions of Chlorhydrol sometimes tend to corrode the metal containers in which they are confined.

Various improvements in the formulation of Chlorhydrol aerosol anti-perspirants have been disclosed, frequently with a view to preventing can corrosion.

Ethanol soluble organic derivatives of aluminum have also been introduced in the aerosol anti-perspirant field, thus making possible the commercial formulation of essentially water-free ethanol aerosol anti-perspirants. Ethanol-soluble products result from the reaction of basic aluminum salts, such as the chloride, with glycols. Jones et al. in U.S. 3,420,932, disclose processes for the preparation of such products and they describe their compositions coordinated complexes of aluminum, having the general formula $Al_2(H_2O)_{y-pz}(OH)_{6-nx}(A)_n(R)_p$ wherein A is selected from the class consisting of chloride, bromide, iodide, sulfate and sulfamate; R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is the valence of A, with $nx$ being from 2 to 4. The 1,2-propylene glycol derivative described by Jones et al. which has the formula

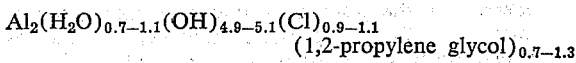

$$Al_2(H_2O)_{0.7-1.1}(OH)_{4.9-5.1}(Cl)_{0.9-1.1}$$
$$(1,2\text{-propylene glycol})_{0.7-1.3}$$

is presently sold as a 50 weight percent solution in ethanol under Armour Pharmaceutical Company's trademark, "Rehydrol."

These complexes hydrolyze in the presence of water, for example, perspiration moisture, to yield aluminum chlorohydroxide, an active anti-perspirant.

Aerosol formulations are known which comprise ethanol and aluminum chlorohydroxide-propylene glycol complex in excess of that which is soluble in the ethanol-liquefied propellant liquid phase. It is theorized that the dissolved complex acts immediately, to reduce perspiration, while the undissolved material provides a reserve which is activated only when active perspiration resumes.

In practice, however, such formulations have encountered problems with respect to valve clogging. Although the particles of the complex are ground to a size small enough to pass through the valve before loading, the particle size tends to increase as the complex dissolves and reprecipitates from the saturated solution as a result of normal rise and fall in temperature, thus clogging the valve.

A novel aerosol anti-perspirant has now been discovered which provides immediate and sustained anti-perspirant protection; does not cake or clog the valve mechanism.

SUMMARY OF THE INVENTION

An aerosol anti-perspirant formulation comprising a fluorocarbon propellant, a dispersion of aluminum chlorohydroxide and fumed silica in an ethanol and 1,2-propylene glycol solution of aluminum chlorohydroxide-propylene glycol complex wherein the concentration of fumed silica is from about 1.0 to about 1.7 percent by weight. The weight ratio of the 1,2-propylene glycol of the solution of the fumed silica is from about 1.8 to about 2.3.

DESCRIPTION OF THE INVENTION

In an attempt to provide prolonged protection, attempts have been made to suspend Chlorhydrol in a less than saturated ethanol solution of "Rehydrol." In this manner it was expected that the advantages of a "reserve" of "Rehydrol" would be realized without the hazard of reprecipitation and clogging. Further, the deposition on the skin of Chlorhydrol, already an active anti-perspirant, was expected to provide instant anti-perspirant protection, whereas with the earlier excess "Rehydrol" system, one had to wait for the hydrolysis of "Rehydrol" before anti-perspirant protection was provided.

Difficulty was, however, encountered in that a stable formulation comprising a suspension of Chlorhydrol in an ethanolic solution of "Rehydrol" could not be prepared. Severe caking of the suspended Chlorhydrol occurred in several hours to the extent that the mixture could not be expelled from the aerosol package, even following shaking.

It has now been found that the addition of critical amounts of fumed silica and 1,2-propylene glycol to dispersions of Chlorhydrol in unsaturated ethanol solutions of aluminum chlorohydroxide-propylene glycol complex ("Rehydrol"), effectively prevents caking and valve clogging. A new type of aerosol formulataion is thus provided which will not cake or clog the valve and which affords both immediate as well as sustained anti-perspirant protection.

The aerosol formulations of the invention may be conveniently prepared by mixing the non-propellant components at room temperature and preferably thereafter passing the mixture through a homogenizer. The mixtures and the propellants are then loaded into dispensing containers by any of the art methods.

Although various fluorocarbon propellants may be employed, dichlorodifluoromethane and 1,2-dichloro-1,1,2,2-tetrafluoroethane are preferable. They may be used separately or in mixture as the propellant in the system. Trichloromonofluoromethane is also suitable but it must be employed in admixture with another propellant, e.g. an admixture of 50% dichlorodifluoromethane and 50% trichloromonofluoromethane.

"Rehydrol," available in 50% by weight solution in ethanol is normally used in the formulations of this invention. Normally 1 to 2 weight percent "Rehydrol," which is insufficient to saturate the ethanol-condensed propellant phase in the dispenser, is used. Since, however, about 26 to 27% by weight of total ethanol based on the total weight of the formulation is necessary to support in dispersion the Chlorhydrol which will be added, it may be necessary to add additional ethanol, e.g., formula 40 denatured ethanol, either absolute or 95 vol. percent. To this solution is added the 1,2-propylene glycol and, if desired, emollient oil, perhydrosqualene and small amounts of other adjuvants such as perfumes and deodorants. The emollient oil and perhydrosqualene, if added, are added preferably at concentrations of from about 7.0 to 8.5 and from about 1.0 to 1.5 weight percent, respectively, based on the total weight of the formulation. The emollient oil and perhydrosqualene are adjuvants and play no critical anti-perspirant role. They may be added, as is customary in the trade, to improve the appearance and feeling of the preparation on the skin and to hold the solids of the formulation in place.

The chlorhydrol and fumed silica are then stirred into the solution forming a dispersion of Chlorhydrol and fumed silica in the ethanol and 1,2-propylene glycol solution of "Rehydrol." For best results this mixture is then passed through a homogenizer.

The mixture and the propellant(s) are then loaded into dispensing containers. The weight ratio of propellant used to alcohol used is preferably about 2:1.

The Chlorhydrol (aluminum chlorohydroxide) concentration may be from about 4.5 to about 5.8 percent by weight but is preferably from about 5.5 to 5.8 percent by weight based on total weight of the formulation. The amounts of 1,2-propylene glycol and fumed silica must be chosen so that the ratio of the propylene glycol to the silica is within the range of about 1.8 to 2.3 and there is present at least from about 1.0 to about 1.7 weight percent of fumed silica. Outside this range caking occurs. It is preferred to use about 2.5 weight percent 1,2-propylene glycol and about 1.1 weight percent fumed silica. It has been found, however, that a non-preferredly thick but useful and non-caking preparation is formed when 2.6 weight percent 1,2-propylene glycol and 1.2 weight percent fumed silica is used and a useful preparation has been prepared using 3.0 weight percent 1,2-propylene glycol and 1.6 weight percent fumed silica. However, so long as the above cited ratio between the 1,2-propylene glycol and the fumed silica is maintained, non-caking, less viscous preparations are obtained with concentrations of 1.1, 1.5, and 1.6 weight percent fumed silica. A fumed silica concentration of up to about 1.7 weight percent is acceptable.

The preferred formulations of this invention contain about 1.1 weight percent fumed silica with a weight ratio of 1,2-propylene glycol to fumed silica of about 2.3.

EXAMPLES

The following example is intended to be merely illustrative of the invention and not in limitation thereof. Unless otherwise indicated, all quantities are on a weight basis.

Six liquid anti-perspirant formulations were prepared as described hereinabove by admixing "Rehydrol," ethanol, emollient oil, perhydrosqualene and 1,2-propylene glycol and stirring into the resultant solution powdered Chlorhydrol and fumed silica and then homogenizing.

To test the mixtures for caking, formulations and propellants were pressure filled through the valve into 4 oz. plastic coated glass aerosol containers and subjected to accelerated caking conditions by storing overnight in a 120–130° F. oven. Other samples, loaded in a similar manner, were stored overnight in a 30° F. refrigerator to test for precipitation.

The six formulations prepared are described in the table below:

TABLE

[Proportion (weight percent)]

| | 1 | 2 | 3 | 4 | 5 | 6 |
|---|---|---|---|---|---|---|
| "Rehydrol" [1] | 2.0 | 2.0 | 2.0 | 1.0 | 2.0 | 2.0 |
| Ethanol [2] | 26.0 | 26.5 | 26.0 | 27.0 | 29.0 | 26.0 |
| Emollient oil [3] | 8.5 | 7.0 | 7.5 | 7.5 | 8.5 | 8.5 |
| Perhydrosqualene [4] | 1.5 | 1.0 | 1.0 | 1.4 | 1.5 | 1.5 |
| 1,2-propylene glycol | 2.5 | 2.6 | 2.5 | 3.0 | | 2.5 |
| Chlorhydrol | 5.5 | 5.8 | 5.5 | 4.5 | 5.5 | 5.5 |
| Fumed silica [5] | 1.1 | 1.2 | 1.5 | 1.6 | 2.0 | |
| Dichlorodifluoromethane | 26.5 | 26.9 | 27.0 | 21.6 | 25.7 | 27.0 |
| Trichlorofluoromethane | 26.5 | 26.9 | 27.0 | | 25.7 | 27.0 |
| 1,2-dichlorotetrafluoroethane | | | | 32.4 | | |
| 1,2-propylene glycol/fumed silica (ratio) | 2.27 | 2.17 | 1.67 | 1.88 | 0 | ∞ |

[1] 50% by weight solution in ethanol.
[2] Formula 40 denatured ethanol.
[3] "Neobee" M-20, Drew Chemical Co. believed to be a polydiester of a short chain fatty acid.
[4] Inactive ingredient used to impart smooth soothing feeling upon application of the anti-perspirant to the skin.
[5] "Cab-O-Sil," Godfrey L. Cabot Corp. Fumed silica as produced by the Cabot Corp. is prepared by the hydrolysis of silicon tetrachloride at about 1,100° C. It is characterized by large surface area. The particle size varies from about 0.0007 micron to about 0.0012 micron.

The results were the following: Formulation 1, the preferred composition of this invention, showed no caking. Occasional slight settling was observed. However, the components were readily redispersed by shaking. Formulation 2 did not cake but the mixture was thicker than is preferred. Formulation 4 using a different propellant mixture was in all respects comparable to formulation I. Formulations 1, 2 and 4 which are within the scope of this invention had satisfactory spray characteristics. Formulations 3, 5 and 6 which are outside the scope of this invention formed hard cakes which could not be redispersed by shaking and the formulations could not be expelled from the container. Chilling to 30° F. produced in formulations 1, 2 and 4 no more than trace precipitates which are readily redispersed on shaking. From the above discussion, the efficacy and superiority of the aerosol anti-perspirant formulations of the present invention, i.e., formulations 1, 2 and 4 are clearly manifested.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A non-caking aerosol anti-perspirant formulation comprising a fluorocarbon propellant, a dispersion of aluminum chlorohydroxide and fumed silica in an ethanol and 1,2-propylene glycol solution of aluminum chlorohydroxide-propylene glycol complex wherein the concentration of aluminum chlorohydroxide-propylene glycol complex is about 0.5 to 1.0 weight percent,
   ethanol is about 27 to 27.5 weight percent,
   fumed silica is from about 1.0 to about 1.7 percent by weight,
   aluminum chlorohydroxide is about 4.5 to 5.8 weight percent,
   fluorocarbon propellant selected from at least one member of the group consisting of dichlorodifluoromethane, 1,2-dichlorotetrafluoroethane, and trichlorofluoromethane in admixture with dichlorodifluoromethane is about 53 to 54 weight percent
   and the weight ratio of the 1,2-propylene glycol of the solution to the fumed silica is from about 1.8 to about 2.3.

2. An aerosol anti-perspirant formulation according to claim 1 wherein the fluorocarbon propellant is a mixture of 1,2-dichlorotetrafluoroethane and dichlorodifluoromethane.

3. An aerosol anti-perspirant formulation according to claim 1 wherein the fluorocarbon propellant is a mixture of dichlorodifluoromethane and trichlorofluoromethane.

4. An aerosol anti-perspirant formulation according to claim 1 wherein the concentration of fumed silica is about 1.1 weight percent and wherein the weight ratio of 1,2-propylene glycol of the solution to silica is about 2.3.

References Cited

UNITED STATES PATENTS

| | | | |
|---|---|---|---|
| 2,990,249 | 6/1961 | Wagner | 423—336 |
| 3,088,874 | 5/1963 | Geary et al. | 424—47 |
| 3,359,169 | 12/1967 | Slater, Jr. et al. | 424—68 |
| 3,509,253 | 4/1970 | Babbin | 424—47 |
| 3,634,480 | 1/1972 | Sheffield | 424—47 K |

FOREIGN PATENTS

| | | | |
|---|---|---|---|
| 978,301 | 3/1965 | Great Britain | 424—47 |

ALBERT T. MEYERS, Primary Examiner

D. R. ORE, Assistant Examiner